April 21, 1964     E. W. HILL ETAL     3,129,631
BRAIDED ARTICLE AND METHOD OF MAKING SAME
Filed Sept. 26, 1961
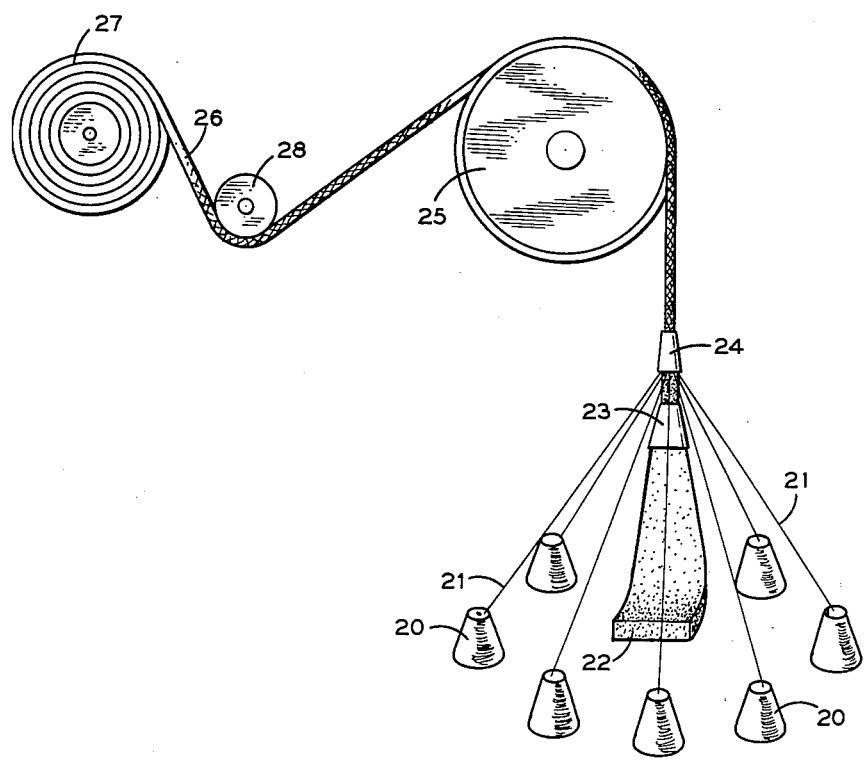
FIG. 3
FIG. 1
FIG. 2
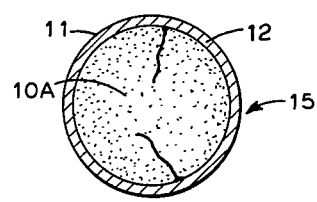
FIG. 4
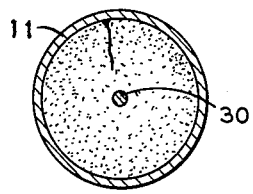
INVENTORS
Earl W. Hill
BY    Wayne W. Beck
*Irving Seidman*
ATTORNEY

United States Patent Office 3,129,631
Patented Apr. 21, 1964

3,129,631
BRAIDED ARTICLE AND METHOD OF
MAKING SAME
Earl W. Hill and Wayne W. Beck, High Point, N.C.,
assignors to Unipoint Industries Inc., High Point, N.C.,
a corporation of North Carolina
Filed Sept. 26, 1961, Ser. No. 140,948
5 Claims. (Cl. 87—6)

This invention relates to strips, edgings and the like in the form of resilient, flexible core elements enclosed in braided filaments, strands or threads.

It has been proposed to provide cords particularly useful as an upholstery accessory, being referred to as seaming cord wherein the same is incorporated along the edges of the upholstery material to give it a finished appearance. Also, such cord is stitched to the underside of the upholstery fabric to produce a raised or ribbed pattern therein. Seaming cord for upholstery has a diameter of the order of 5/32" and has a paper or jute fiber filling. Such seaming cord has no cross sectional resilience and no longitudinal extensibility since the filling is inelastic.

Flexible and elastic fillings may be derived from extruded rubber or polyvinyl chloride, particularly in expanded or cellular form. However, cords incorporating such fillings are quite expensive due to the relatively high cost of extruding the filling. Also, rubber is unsatisfactory as a filling when the cord is exposed to oil, solvents or the sun's rays; as when the same is used in auto or outdoor upholstered furniture. Paper or jute would also be unsatisfactory for such particular usage since the filling would disintegrate upon mold action or even slight amounts of moisture.

It has been found that braided upholstery cords of improved properties may be formed when the filling thereof is derived from polyurethane foams. Such cords have a flexibility and elasticity which results in a neat appearance to the upholstered product incorporating the same. Furthermore, the upholstery fabric does not wear and fray as readily, where it encloses a flexible seaming cord.

Accordingly, an object of this invention is to provide improved seaming cords and edgings for upholstery and other usages, wherein the filling thereof is a polyurethane foam.

Another object of this invention is to provide an improved seaming cord or edging and a method of making the same wherein a filler of polyurethane foam of originally polygonal section is enclosed in a braided filament or thread structure to produce an end product of circular or other arcuate cross section.

Other objects of this invention will in part be obvious and in part hereinafter pointed out.

In the drawing, FIG. 1 is a sectional view in enlarged form of a filling element for the braided article embodying the invention; FIG. 2 is a sectional view of said element after it has been enclosed in a braided covering. FIG. 3 is a diagrammatic view showing the procedure for making the braided article; and FIG. 4 is a cross sectional view similar to that of FIG. 2, showing a modified form of the invention.

As shown in FIG. 1, a filler strip 10 is provided in the form of a polyurethane foam and with a square or rectangular section. Conveniently, such strip 10 may be cut from sheets of selected thickness, to a selected width. Also, scrap polyurethane may be readily converted to the desired strip form.

Thus, a filler strip of polyurethane foam having a density of 1.5 pounds per cu. ft., and measuring 1/2" x 3" x 30' was braided with nylon filaments in a conventional braiding machine, the resulting braid having 20 picks to the inch. The finished product 15, indicated in FIG. 2, is of circular cross section with filler 10A enclosed by braided cover 11 made up of filaments 12. The finished strip had a circular cross section of 7/16" diameter and was 46' long under no tension and could be further extended by 15' by stretching. On release, the cord 15 regained its original length of 46'.

Similarly, a strip of prepolymer foam having a density of 2 pounds per cu. ft. was braided with glass fiber. The original section of the strip of 1/2" x 3" was changed to a circular section of 3/8" diameter. Also, a urethane foam strip having a section of 1" x 3" was braided with polypropylene monofilaments to give 40 picks per inch and a finished braid diameter of 1/2". This particular product proved excellent as a webbing for outdoor furniture, replacing flat springs or rubber webbing.

Polyurethane foam with a square cross section measuring 2" x 2" was braided with mildew proofed rayon thread and then enclosed in a rayon strip fabric to provide a weather stripping of 3/4" diameter and particularly useful in weatherstripping automobile bodies.

As shown in FIG. 3, the procedure for making the improved braided cord is based on a conventional braiding device which includes the usual bobbins 20 carrying threads 21 and arranged on the usual support plate, not shown. The foam strip 22 of selected cross section and dimensions moves through the central opening of said support plate and passes through an initial forming eye 23 wherein said strip is compressed and deformed to a circular or substantially circular section.

The threads 21 are then braided about the moving strip and passed through a second forming eye 24 of suitable section dimensions. A bull wheel indicated at 25 pulls the braided material through eyes 23, 24. The tension applied to the material as it is pulled by bull wheel 25, the speed of extrusion, as well as the dimensions of eyes 23, 24 will determine the diameter of the finished product. The rate of movement of the foam strip and the speed of the moving bobbins 20 will determine the threads or picks to the linear inch of the braided product. The braided product 26 is taken up on take up reel 27. The glue line may be applied along the length of the braid 26 as by a glue applying roller 28 to prevent unraveling of the braid when the strip is cut into sections.

Obviously, the cross section of the finished cord or strip may be of elliptical or other shape, through selection of the section of the eyes 23, 24, the tension provided by the bull wheel and the picks per inch of braiding. Furthermore, the strip of polyurethane foam may have various initial sections other than rectangular or square, being converted to circular, elliptical or other sections of arcuate outline, by the procedure described above. Slitting sheets of polyurethane, particularly scrap, provides a convenient source of filling strip.

While the resultant braided product, made in accordance with the instant invention is particularly useful in the furniture upholstery arts, it is understood that such products may also be used as weather stripping, piping for clothing, dresses, hats, and the like.

Furthermore, the ultimate properties of the finished product may be varied by adjusting the tension on the filling strip 22 as the same passes through the braiding device, thereby varying the degree of elasticity and resilience. The extent of reduction of the cross section of the filling strip 22 may also be varied by adjustment of the tensions of the threads 21 as they leave bobbins 20. The filaments may be monofilaments or twisted staple and may be colored or otherwise treated to resist mildew or to be flame retardant.

Seaming cords made in accordance with the instant invention are particularly useful in trimming tight cushions used on sofas or the like. Thus, a cushion made of a polyurethane foam core with a density of 1.5 lbs. per cu. ft. or less with a fabric cover and an edging of seaming cord made in accordance with the instant invention, will be stable and will not tilt when sat upon, as when the cushion is a part of daybed or sofa. A similar cushion made with a seaming cord having a paper or jute filler, will tilt when sat upon at one end thereof since such cord has no appreciable extensibility.

For certain usage, it may be desirable to provide a seaming cord, edging or weather stripping having cross sectional elasticity but limited or no longitudinal extensibility. This form of the invention is provided by incorporating a monofilament thread, wire or fabric strip, as shown at 30, see FIG. 4; which is suitably associated with the filler strip 10, as the same is being formed and braided.

As the tension applied to the foam strip 10, is varied, and with selection of the number of picks to the inch of braiding threads 21, the degree of extensibility of the finished product may be varied to provide no extensibility; extensibility limited by the elasticity of element 30, or elasticity up to a point where element 30 becomes taut.

As various changes might be made in the embodiments of the invention herein disclosed, without departing from the spirit thereof, it is understood that all matter herein shown or described shall be deemed illustrative and not limiting except as set forth in the appended claims.

What is claimed is:

1. A method of forming a braided strip comprising a flexible resilient filler element and a braided covering therefor comprising passing a strip of polyurethane foam of polygonal cross section in a tensioned condition through a braiding device, compressing said tensioned strip to a cross section of arcuate outline, and braiding filamentary material about the peripheral surface of said compressed and tensioned strip to retain said converted section.

2. A method of forming a braided strip comprising passing a strip of polyurethane foam having a quadrilateral cross section through a braiding device, tensioning said strip, deforming the cross section of the tensioned strip to a circular cross section, and braiding filamentary material about the peripheral surface of said tensioned and deformed strip to retain said circular cross section.

3. A resilient, extensible strip comprising a longitudinally tensioned filler of polyurethane foam and a braided filamentary covering in contact with the peripheral surface of said tensioned filler, said strip and filler each having a circular cross section, said filler having a quadrilateral cross section in its original, untensioned form, the circular cross section of said strip and the tensioned filler thereof being retained by said braided covering.

4. A method of forming a resilient, longitudinally extensible upholstery cord comprising providing an elongated strip of polyurethane foam of rectangular cross section, feeding said strip under tension toward a braiding device, passing the tensioned strip through a forming device for deforming the tensioned strip to circular cross section, braiding filamentary material directly about said strip of deformed cross section to retain the deformed cross section in the finished strip.

5. A resilient strip comprising a longitudinally tensioned filler of polyurethane foam having initial polygonal cross section, a braided filamentary covering in contact with the peripheral surface of said tensioned filler, said strip having an arcuate cross section, and elongate means extending along the length of said strip for limiting the extensibility of said strip.

References Cited in the file of this patent
UNITED STATES PATENTS

| | | |
|---|---|---|
| 2,031,211 | Herkenberg | Sept. 3, 1935 |
| 2,101,004 | Fox | Nov. 30, 1937 |
| 2,107,467 | Buhler | Feb. 8, 1938 |
| 2,248,123 | Sackner | July 8, 1941 |
| 2,465,081 | Fleischer | Mar. 22, 1949 |
| 2,600,143 | Vaughn | June 10, 1952 |
| 2,979,982 | Weitzel | Apr. 18, 1961 |
| 3,001,359 | Simon | Sept. 26, 1961 |
| 3,014,087 | Kaplan | Dec. 19, 1961 |
| 3,033,722 | Goodloe | May 8, 1962 |